United States Patent
Milosevic et al.

(10) Patent No.: US 11,286,183 B2
(45) Date of Patent: Mar. 29, 2022

(54) SYSTEM AND METHOD FOR TREATMENT OF SPENT CAUSTIC WASTEWATER

(71) Applicant: Envirosystems Inc., Dartmouth (CA)

(72) Inventors: Veselin Milosevic, Bedford (CA); Drago Kosanic, Halifax (CA); Fernando Naranjo Palacio, Dartmouth (CA)

(73) Assignee: ENVIROSYSTEMS INC., Dartmouth (CA)

( * ) Notice: Subject to any disclaimer, the term of this patent is extended or adjusted under 35 U.S.C. 154(b) by 934 days.

(21) Appl. No.: 14/945,922

(22) Filed: Nov. 19, 2015

(65) Prior Publication Data
US 2017/0144908 A1   May 25, 2017

(51) Int. Cl.
*C02F 1/36* (2006.01)
*C02F 1/72* (2006.01)
(Continued)

(52) U.S. Cl.
CPC ............... *C02F 1/725* (2013.01); *C02F 1/30* (2013.01); *C02F 1/36* (2013.01); *C02F 1/66* (2013.01); *C02F 1/78* (2013.01); *C02F 9/00* (2013.01); *C02F 2101/10* (2013.01); *C02F 2101/32* (2013.01); *C02F 2101/345* (2013.01); *C02F 2101/38* (2013.01); *C02F 2101/40* (2013.01); *C02F 2103/365* (2013.01); *C02F 2303/02* (2013.01)

(58) Field of Classification Search
CPC .... C02F 1/725; C02F 1/66; C02F 1/78; C02F 1/36; C02F 1/30; C02F 2101/32; C02F 2101/40; C02F 2101/10; C02F 2103/365; C02F 2101/345; C02F 2101/38; C02F 2303/02
See application file for complete search history.

(56) References Cited

U.S. PATENT DOCUMENTS 2,580,809 A * 1/1952 Marks ....................... C02F 1/72
                                                      210/753
3,761,409 A   9/1973 McCoy et al.
(Continued)

FOREIGN PATENT DOCUMENTS

CA       2863051       3/2015
CN     101445304       6/2009
(Continued)

OTHER PUBLICATIONS

Munter, "Advanced Oxidation Process—Current status and prospects", Proceedings of the Estonian Academy of Sciences Chemistry., Jun. 2001, vol. 50, No. 2, pp. 59-80.
(Continued)

*Primary Examiner* — Walter D. Griffin
*Assistant Examiner* — Cameron J Allen
(74) *Attorney, Agent, or Firm* — Gowling WLG (Canada) LLP

(57) ABSTRACT

The present disclosure relates to a process for treating and regenerating a spent caustic solution at ambient temperatures and pressure which includes oxidizing spent caustic wastewater with a brine solution and ozone mixture, supported by irradiation of the spent caustic wastewater by ultrasound. A range of wastewater treatment techniques may also be included to reach a desired effluent quality level.

11 Claims, 6 Drawing Sheets

(51) Int. Cl.
*C02F 1/66* (2006.01)
*C02F 1/78* (2006.01)
*C02F 1/30* (2006.01)
*C02F 9/00* (2006.01)
*C02F 101/32* (2006.01)
*C02F 101/10* (2006.01)
*C02F 103/36* (2006.01)
*C02F 101/34* (2006.01)
*C02F 101/38* (2006.01)

(56) References Cited

U.S. PATENT DOCUMENTS

| | | | |
|---|---|---|---|
| 4,370,241 | A | 1/1983 | Junkermann et al. |
| 4,417,986 | A | 11/1983 | Connaught et al. |
| 4,557,926 | A | 12/1985 | Nelson et al. |
| 4,584,107 | A | 4/1986 | Odaka et al. |
| 4,600,406 | A | 7/1986 | Corte |
| 4,849,114 | A | 7/1989 | Zeff et al. |
| 5,082,571 | A | 1/1992 | Beula et al. |
| 5,130,033 | A | 7/1992 | Thornhill |
| 5,240,600 | A | 8/1993 | Wang et al. |
| 5,244,576 | A | 9/1993 | DeRoeck et al. |
| 5,246,597 | A | 9/1993 | Jenson et al. |
| 5,254,526 | A | 10/1993 | Hamilton |
| 5,268,104 | A | 12/1993 | Masoomain |
| 5,338,461 | A | 8/1994 | Jones |
| 5,424,032 | A | 6/1995 | Christensen et al. |
| 5,514,293 | A | 5/1996 | Shimakura et al. |
| 5,603,840 | A | 2/1997 | Strittmatter et al. |
| 5,891,346 | A | 4/1999 | Huntley |
| 6,007,726 | A | 12/1999 | Yang et al. |
| 6,126,810 | A | 10/2000 | Fricker et al. |
| 6,210,583 | B1 | 4/2001 | Kurukchi et al. |
| 6,303,038 | B1 | 10/2001 | Sanders et al. |
| 6,576,144 | B1 | 6/2003 | Vineyard |
| 7,968,761 | B1 | 6/2011 | Cox |
| 2003/0141202 | A1 | 7/2003 | Nakamura et al. |
| 2003/0173300 | A1 | 9/2003 | Bradley |
| 2004/0182793 | A1 | 9/2004 | Owens |
| 2005/0147528 | A1 | 7/2005 | Shim et al. |
| 2006/0006122 | A1* | 1/2006 | Burns ............... C02F 1/008 210/758 |
| 2012/0261345 | A1* | 10/2012 | Hassler ............... C02F 1/281 210/669 |
| 2013/0022720 | A1 | 1/2013 | Ferry et al. |
| 2013/0048558 | A1 | 2/2013 | Arai et al. |
| 2014/0113003 | A1 | 4/2014 | King et al. |
| 2014/0239221 | A1* | 8/2014 | Harrison ............... C09K 5/10 252/67 |
| 2014/0374103 | A1 | 12/2014 | Seth et al. |
| 2014/0374104 | A1 | 12/2014 | Seth |

FOREIGN PATENT DOCUMENTS

| | | |
|---|---|---|
| FR | 2511359 | 2/1983 |
| GB | 2306464 | 5/1997 |
| WO | 2013091845 | 6/2013 |

OTHER PUBLICATIONS

Solvay Interox, Inc., Hydrogen Peroxide Controlling Reduced Sulfur Compounds, www.solvayinterox.com/au, Oct. 2001, pp. 1-9.

Smith, "Ridding Process Waters and Caustic Solutions of Sulphides" Oil & Gas Journal, Jul. 1956, pp. 95-99.

Martin, et al., "New Column Removes Sulfide with Air", Hydrocarbon Processing & Petroleum Refiner, 41, May 1962, pp. 149-1532.

Suslick, "Sonochemistry", Kirk-Othmer Encyclopedia of Chemical Technology, 4th Ed., J. Wiley & Sons, New York, 1998, vol. 26, pp. 517-541.

Suslick et al., "Heterogeneous sonocatalysis with nickel powder", Journal of the American Chemical Society, 1987, vol. 109, pp. 3459-3461.

Duke et al., "The Homogeneous Base-catalyzed Decomposition of Hydrogen Peroxide", The Journal of Physical Chemistry, vol. 65, No. 2, pp. 304-306, 1961-02.

Montana Refining Company, Spent Sulfidic Caustic Material Safety Data Sheet, Issue No. 2, Jan. 2011.

Adewuyl et al., "Kinetics of Oxidation of Dimethyl Sulfide by Hydrogen Peroxide in Acidic and Alkaline Medium", Environmental Science and Technology, vol. 20, No. 10, pp. 1017-1022.

FMC Foret, "Spent Caustic treatment with OHP Wet Peroxide Oxidation", 2009.

Takenaka, et al., "Rapid Reaction of Sulfide with Hydrogen Peroxide and Formation of Different Final Products by Freezing Compared to Those in Solution", International Journal of Chemical Kinetics, vol. 35, No. 5, pp. 198-205, Feb. 2003.

United States Environmental Protection Agency, "Peroxone (Ozone/Hydrogen Peroxide)", EPA Guidance Manual—Alternative Disinfectants and Oxidants, Chapter 7, pp. 1-20, Apr. 1999.

Maugans, et al., "Disposal of Spent Caustic at the Repsol YPF Refinery in La Pampilla, Peru", Natural Petrochemical & Refiners Association Environmental Conference, Sep. 2007.

Eckenfelder, et al., Industrial Water Quality, Fourth Edition, Chapter 10, pp. 577-601, 2009.

Hoffman, "Ozone-Bromine Treatment—Water Treatment in Public Pools without Chlorine: A New Standard?", Ozone: Science & Engineering, vol. 37, No. 5, pp. 456-466, Jun. 2015.

Canadian Intellectual Property Office as International Searching Authority, International Search Report and Written Opinion for PCT Patent App. No. CA2015/051205, Jul. 28, 2016.

Abou-Gamra et al., "Kinetics of oxidative decolorization of Amaranth red with acidic bromate", European Chemical Bulletin, vol. 3., No. 7, pp. 729-733, 2014.

* cited by examiner

SYSTEM AND METHOD FOR TREATMENT OF SPENT CAUSTIC WASTEWATER

TECHNICAL FIELD

The present disclosure relates to wastewater treatment, and more particularly to a system and method for treatment of spent caustic wastewater.

BACKGROUND

Spent caustic wastewater is an aqueous waste stream when petroleum derived fluids are processed with aqueous sodium hydroxide. It is formed out of scrubbing processes where excess sulfur compounds are removed from refined mid and final products, creating a stream with very high amounts of hydrogen-sulfide, organic disulfides, phenolics, mercaptans, and other hydrocarbon compounds. In addition, high residual sodium-hydroxide has a pH range from 11-14. The spent caustic wastewater produced from this processing is typically dark brown in color, turbid, highly alkaline, contains high levels of sulfides and has a pungent odor characteristic of olefins and sulfides.

Spent caustic wastewater handling, treatment and disposal is a major concern for oil refining and olefins production facilities due to their hazardous nature and noxious properties. As sources of spent caustic generation are diverse, they produce characteristically different wastewater streams of inorganic and organic acidic compounds such as carbon-dioxide sulfides, carbonates, mercaptans, phenolics, cresylics and naphthenates. Most of these compounds are acidic and must be removed from the process to avoid corrosion of downstream equipment and to prevent or reduce the likelihood of poisoning catalysts.

Although both oil refineries and petrochemical plants generate a wastewater stream that belongs to this category, the actual chemical composition of these wastewater streams varies significantly from one plant to another depending on site deployed refining/purification processes as well as a type of crude oil/raw material being used. For example, the oil refining spent caustic stream comes from multiple sources, and includes sulfidic, naphthenic, and cresylic spent caustic waters. Sulfidic spent caustic is generated by a scrubbing process of liquefied petroleum gas (LPG) and pentane from catalytic cracker (FCC), as well as continuous distillation unit (CDU). Naphthenic spent caustic comes from the Merox® type treatment of kerosene. On the other hand, cresylic spent caustic comes from the Merox® type treatment of visbreaker gasoline.

The spent caustic is considered one of the most difficult streams to handle by wastewater treatment industry professionals. Typical conventional treatment options range from steam and/or air stripping, chemical oxidation to oxidation supported by high pressure and incineration. Disadvantages of using these techniques relate to high capital deployment per unit basis, high operating costs, incomplete treatment requiring additional treatment steps and associated safety concerns.

Therefore, there is provided a novel method and system for treating spent caustic wastewater which overcomes disadvantages of the prior art.

SUMMARY

The disclosure is directed at an improved system and method for treating a wastewater stream containing inorganic and organic impurities. More specifically, the disclosure relates to method for treating spent caustic wastewater to provide an effluent quality level suitable for discharge into the environment and/or regeneration of the spent caustic solution.

A process for treating spent caustic includes the oxidation of the spent caustic wastewater while exposing the spent caustic wastewater to oxidation supported by ultrasound cavitation under intense mixing conditions where sulfur-based compounds are converted into benign compounds (mostly sulfates). The process may also include chemical adjustment/treatment where wastewater pH is adjusted to meet downstream treatment and handling requirements, and additional treatments and/or polishing, where residual contaminants are removed to meet wastewater discharge criteria.

One advantage of the current disclosure is the combination of chemical oxidation and ultrasound irradiation for the treatment of spent caustic wastewater along with the use of a brine solution and/or mixture.

In one aspect, there is provided a system for treating spent caustic wastewater comprising a treatment system including a brine mixture and oxygen treatment apparatus for mixing a brine mixture and ozone with the spent caustic wastewater, a pH adjustment apparatus for mixing acid with the spent caustic wastewater, and an agitator for providing a mechanical catalyst to an output of the oxygen treatment apparatus, and an ultrasound apparatus to assist in accelerating chemical reactions between the spent caustic wastewater, the brine mixture and ozone, wherein the combination of the brine mixture, ozone and spent caustic wastewater and the mechanical catalyst produce a treated wastewater.

In another aspect, there is provided a method of treating spent caustic wastewater comprising adding a brine mixture to the spent caustic wastewater, adding ozone to the spent caustic wastewater, applying a mechanical catalyst to a combination of the brine mixture, ozone and the spent caustic wastewater, and applying an ultrasound cavitation to the combination of the brine mixture, ozone and the spent caustic wastewater.

BRIEF DESCRIPTION OF THE DRAWINGS

These and other features will become more apparent from the following description in which reference is made to the appended drawings wherein.

DETAILED DESCRIPTION

The disclosure is directed at a system and method for treating spent caustic wastewater. In another embodiment, the system of the disclosure can be efficiently used for removal of other difficult to break down compounds present in industrial wastewater. While the disclosure has a wide application range for the removal of inorganic and organic impurities from spent caustic wastewater, the current disclosure focuses on the treatment of oil refining spent caustic wastewater. In a preferred embodiment, the disclosure includes the use of a brine solution or mixture, ozone and ultrasonic vibrations or irradiation in the treatment of this wastewater. While a brine solution is a liquid, the system may also use a mixture of brine solutions and/or dry materials which collectively may be seen as a brine mixture.

In one embodiment, the treatment process includes two (2) operating functions whereby during each function, the wastewater is sampled and analyzed, at regular intervals, for total sulfide content and pH. The function that is utilized to treat the spent caustic wastewater is dependent upon the particular chemical characteristics of the wastewater being treated.

These operating functions include, but are not limited to, a brine solution and an ozone sulfide decreasing function and a pH lowering function. These will be described in more detail below.

Generally, the composition of a spent caustic stream, or spent caustic wastewater, is based on sulfides, mercaptans, thiosulfate, and phenols. The oxidation reactions of sulfide and other reduced sulfur compounds by ozone and a brine solution or mixture can be used for industrial wastewater treatment.

Use of the brine solution or mixture (as a secondary oxidant) provides various benefits over current systems. These advantages include, but are not limited to, improved safety, improved productivity, and better cost efficiency for the treatment of spent caustic wastewater. In experiments, as will be described in more detail below, use of a brine solution, such as sodium-bromide or other metal soluble salts of bromide (such as, but not limited to, potassium-bromide, magnesium-bromide, calcium-bromide and zinc-bromide) can be used as the secondary oxidant in the process with very improved treatment results. Use of sodium-bromide as the sole oxidant has been confirmed to have resulted in low or negligible contaminants removal efficiency, however, the mixing of the sodium bromide with a strong oxidant, such as ozone, to produce bromine, which acts as a powerful secondary oxidant, improves the use of the brine solution in the treatment of spent caustic wastewater.

Figure 1:
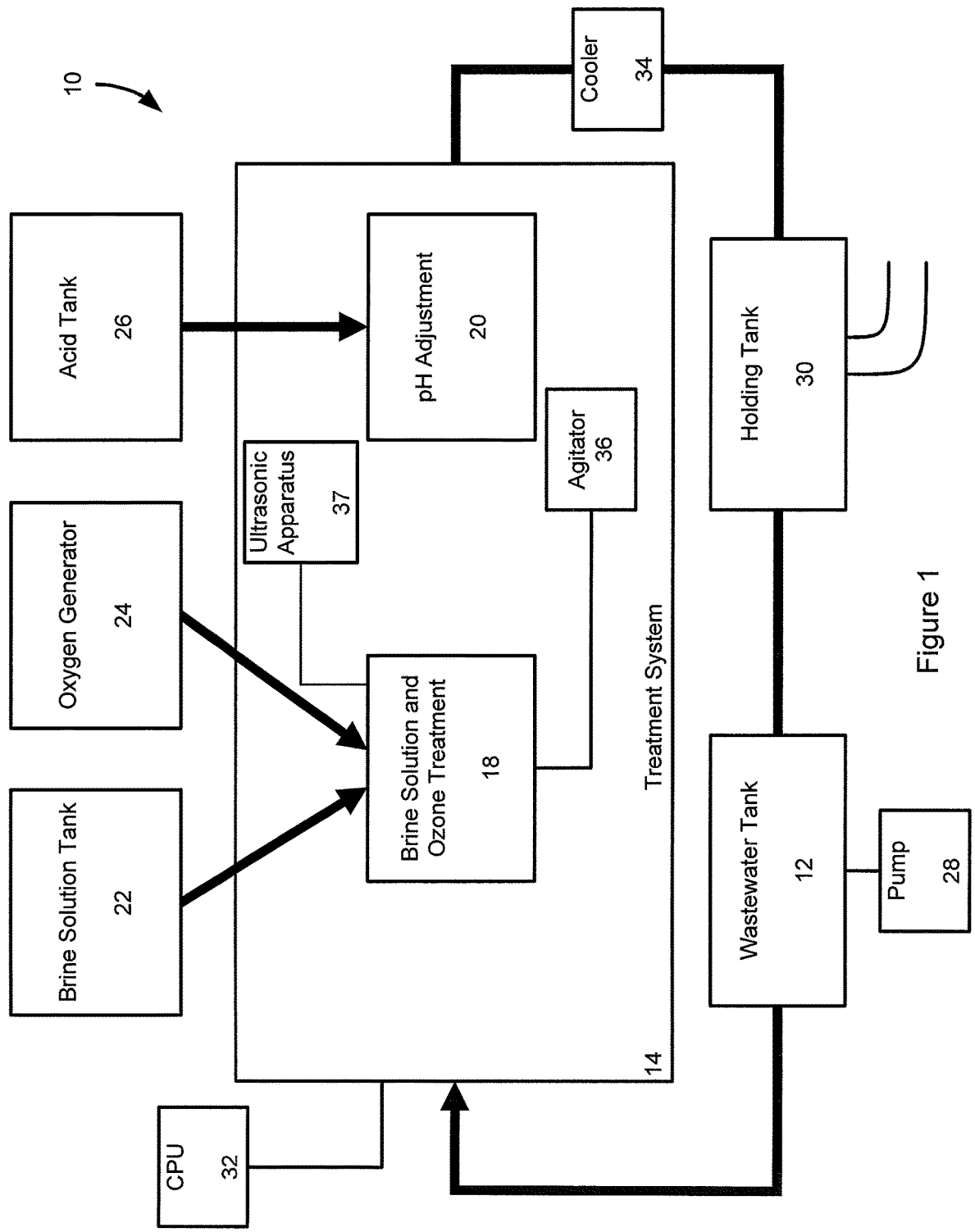
FIG. 1 is a schematic diagram of a first embodiment of a system for treating spent caustic wastewater.

Turning to FIG. 1, a schematic diagram of a system for treatment of spent caustic wastewater is shown. The system 10 includes a wastewater tank 12 which is connected to an input of a treatment system 14. The wastewater tank 12 contains the spent caustic wastewater, or wastewater, that is to be treated. In one exemplary embodiment, the volume of the wastewater tank 12 may be approximately 50,000 liters; however, the wastewater tank may be any suitable size. Although not shown, carbon pillows may be positioned to obstruct openings at the top of the tank 12 to inhibit or reduce the likelihood of the emission of offensive odors from the wastewater to the ambient environment.

The treatment system 14, which may be housed within a main equipment enclosure, includes equipment that chemically treats the spent caustic wastewater or treatment process stream, namely, a brine solution and ozone treatment apparatus 18 and a pH adjustment apparatus 20 by pumping a mixture of brine solution and oxygen and acid, respectively, into the process stream. Although described as a brine solution and ozone treatment apparatus, as a brine solution is preferably used. The apparatus may also be seen as a brine mixture and ozone treatment apparatus 18. The ozone treatment apparatus 18 may also include apparatus such as, but not limited to, ozone gas diffusers. The term "process stream" may be used interchangeably with the term "wastewater" in the current description and refers to the spent caustic wastewater as it is being pumped through and treated by the system 10.

The brine solution and ozone treatment apparatus 18 is connected to a brine solution tank 22 and an oxygen generator 24 while the pH adjustment apparatus 20 is connected to an acid tank 26. In a preferred embodiment, the brine solution or mixture tank 22, the oxygen generator 24 and the acid tank 26 may also be housed within the main equipment enclosure and seen as part of the treatment system 14.

The brine solution may be made with a salt such as Fluoride, Chloride, Bromide or Iodide with the salt acting as a source of the secondary oxidant. The brine solution or mixture may be delivered as a dry material or a concentrated solution to the brine and ozone treatment apparatus 18. If delivered as a concentrated solution, the solution may be up to a 50% percentage solution.

In the current embodiment, a cooler 34, or coolant pump, is located between an output of the treatment system 14 and a holding tank 30. A central processing unit (CPU), or control system, 32 for controlling the treatment system 14 also forms part of the system 10. The control system, or CPU, continuously monitors data from the treatment system 14, such as, but not limited to, temperature data, pressure data, level and flow sensor data, chemical analyzer data an/or inputs from the user. The CPU 32 may also control the process stream and the progression of the treatment process and enunciate warnings to the user, shut the system down or both if an unsafe condition is sensed.

The holding tank 30 stores the wastewater after it has been treated by the treatment system 14. This may be seen as treated wastewater. The holding tank 30 is connected to the wastewater tank 12 for delivering the treated wastewater back to the wastewater tank 12 if the treated wastewater is deemed to require further treatment. For instance, this may be because the treated wastewater is not clean enough, because the temperature of the treated wastewater needs to be further cooled or because further pH treatment of the treated wastewater is required. The holding tank 30 may also output the treated wastewater to further devices or apparatus for further processing or other uses.

The wastewater tank 12, the holding tank 30 and the treatment system 14 are all connected via piping allowing the wastewater and the treated wastewater to be transmitted between the wastewater tank 12, the holding tank 30 and the system 14 and vice-versa.

Although the treatment system 14 of FIG. 1 is shown with one brine solution and ozone treatment apparatus 18 and one pH adjustment apparatus 20, multiple apparatus may be included in the treatment system 14 and only one is shown for clarity and ease of display and explanation.

An agitator 36, or machine for producing a mechanical catalyst in the form of agitation, such as a disk mixer, is located within the treatment system 14 for agitating an output of the brine solution and ozone treatment apparatus 18 thereby accelerating the chemical reactions. In other words, the agitator 36 may be seen as being downstream from the brine solution and ozone treatment apparatus 18. The system 10 further includes an ultrasonic irradiation apparatus 37 which provides ultrasonic irradiation to the mixture, or process stream, being treated in order to create cavitation bubbles.

In a preferred embodiment, the brine solution and ozone treatment apparatus 18, the agitator 36 and the ultrasonic irradiation apparatus 37 may be combined as a single apparatus to deliver the brine solution ozone gas and provide ultrasonic agitation.

Figure 2:
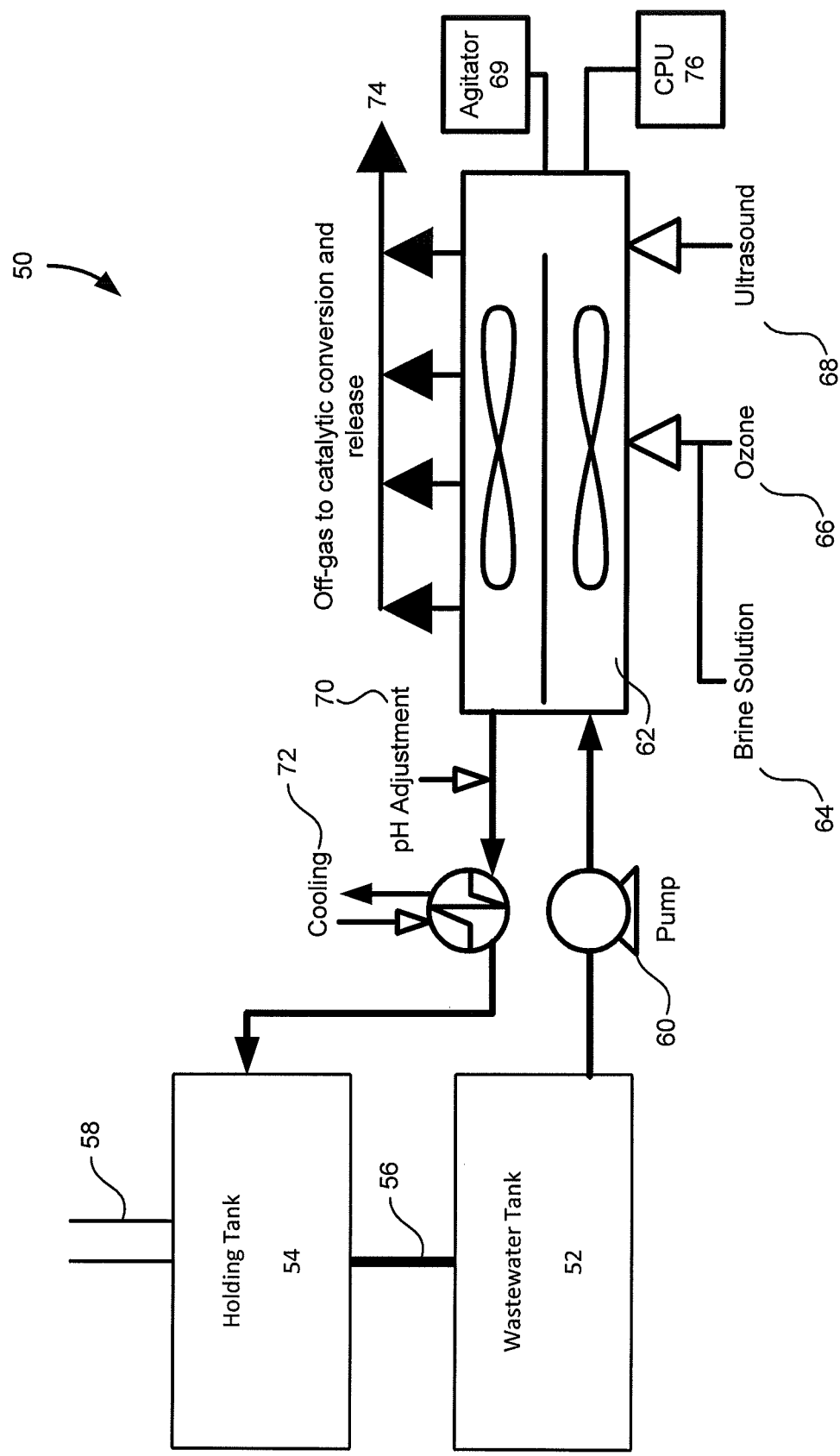
FIG. 2 is a schematic diagram of a second embodiment of a system for treating spent caustic wastewater.

Turning to FIG. 2, a schematic diagram of another embodiment of apparatus for treating spent caustic wastewater is shown. In this embodiment, a system 50 includes a wastewater tank 52 for storing the wastewater to be treated and a holding tank 54 for holding or storing treated wastewater. Although not necessary, the wastewater is preferably stored at ambient temperature. The holding tank 54 has at least two outputs, with one output 56 connected to the wastewater tank 52 for delivering the treated wastewater to the wastewater tank 52 if the treated wastewater needs further treatment and a second output 58 which delivers the treated wastewater for further processing (such as to the apparatus shown in FIGS. 3 and 4).

In operation, a pump 60 pumps or delivers the wastewater from the tank 52 to a treatment system 62. Inputs to the treatment system 62 include, but may not be limited to, a brine solution (from a brine solution tank 64) and ozone (from an oxygen generator 66) or a mixture of the brine solution and ozone. A mechanical catalzyer 69, in the form of a disk mixer or an agitator, and an ultrasonic irradiation machine 68, are also connected to the treatment system 62 for providing a mechanical catalyst to assist in accelerating chemical reactions and to provide ultrasonic cavitation, respectively, as discussed above. After the wastewater has been treated by the treatment system 62, the pH of the treated wastewater is adjusted by a pH adjustment apparatus 70 via the addition of an acidic or basic solution.

The treated wastewater is then cooled via a cooler or cooling apparatus 72 before being delivered or pumped back into the holding tank 54. During the treatment process, gases may be emitted from the treatment system which may be treated via a catalytic conversion process and then released into the environment such as shown by arrow 74. A CPU 76 controls the treatment system 62.

Figure 3:
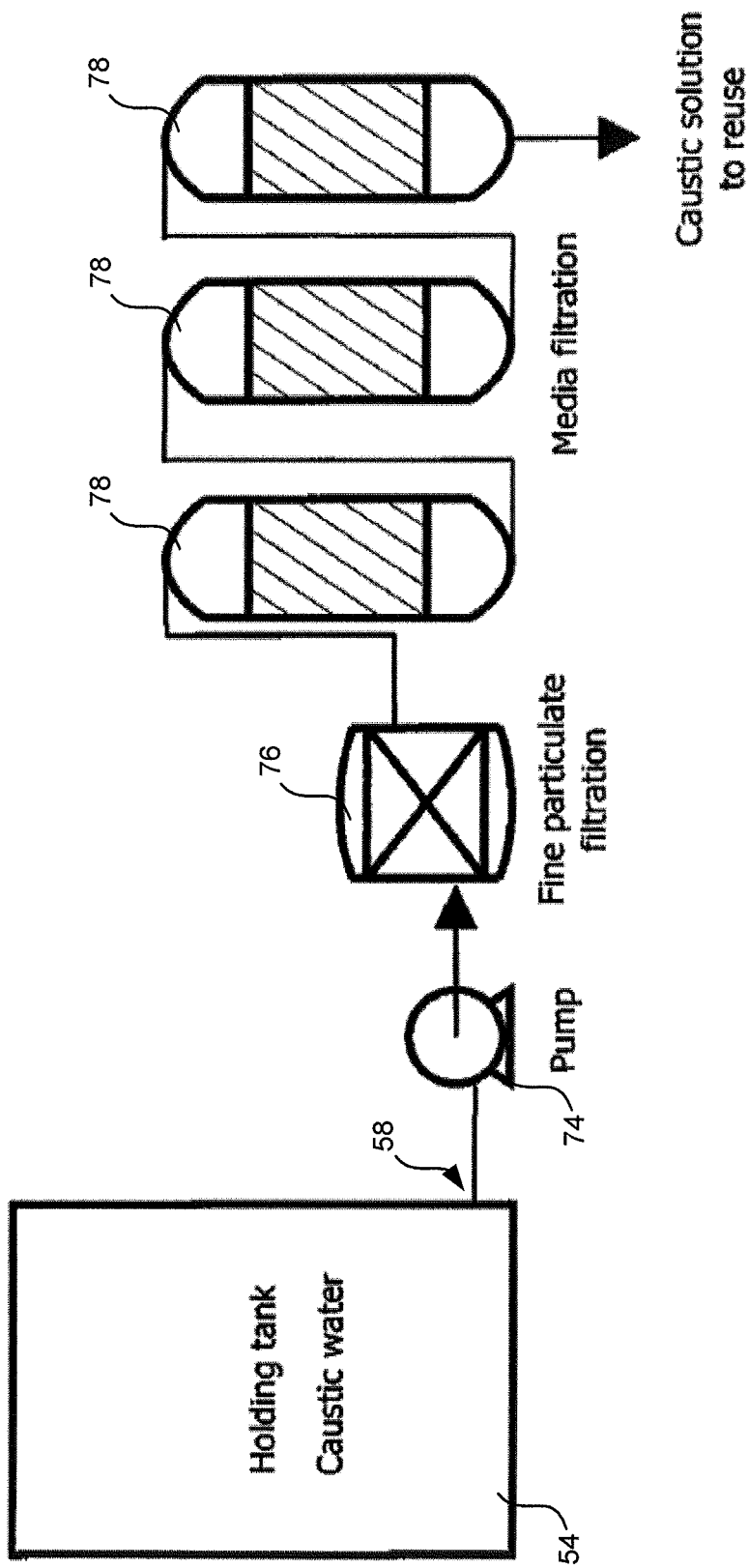
FIG. 3 is a schematic diagram of apparatus for further treatment or treated spent caustic wastewater.
Figure 4:
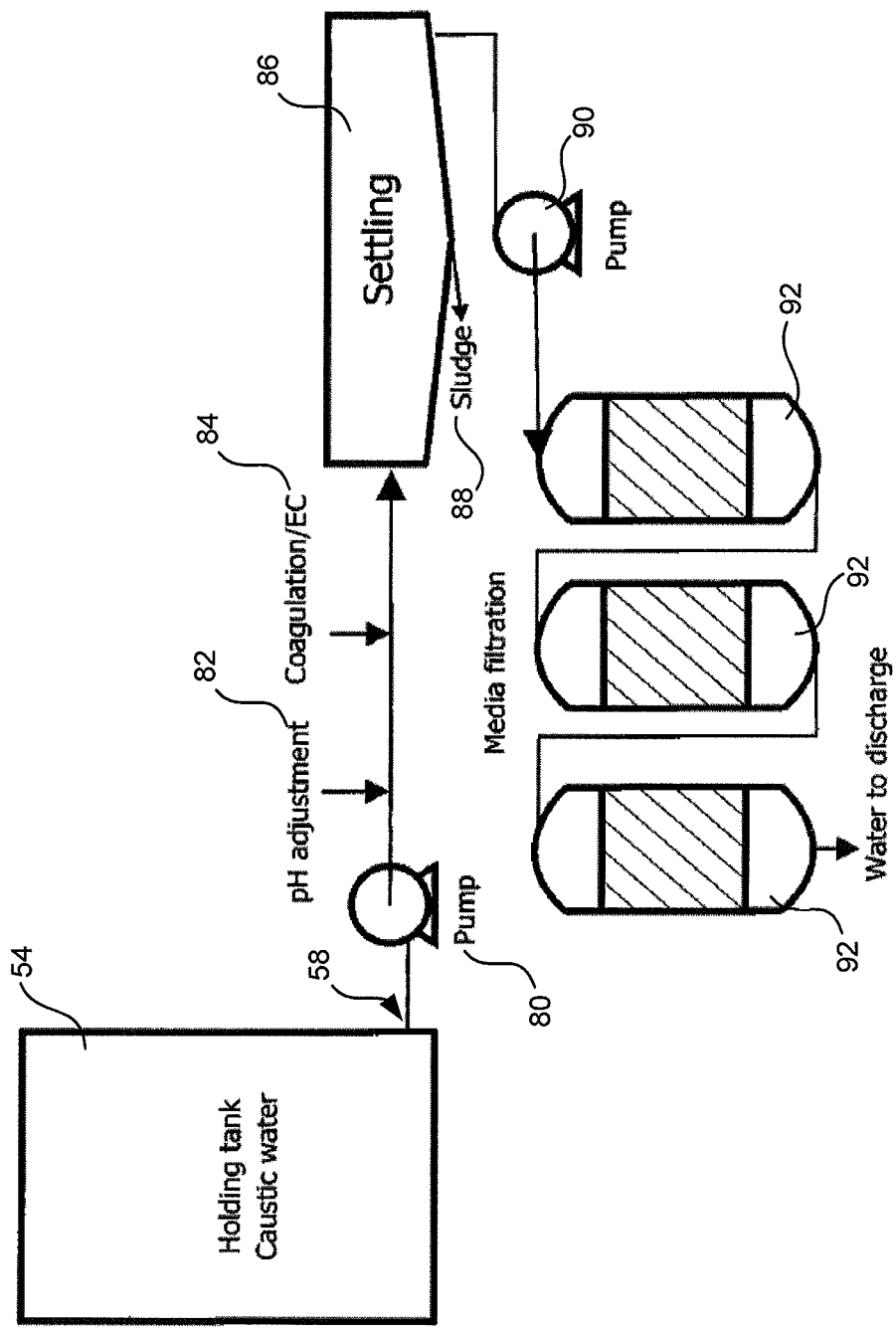
FIG. 4 a schematic diagram of another apparatus for further treatment or treated spent caustic wastewater.

FIGS. 3 and 4 show apparatus which may be used for further processing of the treated wastewater. These apparatus for further processing may provide further benefit to the treated wastewater but are optional to the treatment method and apparatus or system of the disclosure.

Turning to FIG. 3, an output of the holding tank 54 is pumped (via pump 74) through the second output 58. The treated wastewater is passed through a filter 76 which assists in performing fine particulate filtration of the treated wastewater to remove suspended solids and fine oil droplets. The treated wastewater is then passed, or pumped, through a series of media filtration devices 78 to remove trace impurities such as, but not limited to, residual organics, colour compounds and/or odor compounds. In one embodiment, the media filtration devices 78 employ activated carbon, bentonite and/or organically modified clay, and activated alumina. The output from the media filtration devices (which is preferably a caustic solution) may then be collected to be re-used.

Turning to FIG. 4, an output of the holding tank 54 is pumped (via a pump 80) through the second output 58 (or possibly another output of the holding tank 54) through a pH adjustment apparatus 82 and a coagulation/electro-coagulation apparatus 84. Although not shown, the output of the holding tank 54 may also pass through a fine filtration device (such as the filter 76 of FIG. 3) before passing through the pH adjustment apparatus 82.

In one embodiment, at the pH adjustment apparatus 82, the treated wastewater is treated by an acid such as a hydrochloric acid or a sulfuric acid at any concentration, to bring down the pH level of the treated wastewater to a point where the coagulation/electro-coagulation may be more efficiently performed by the coagulation/electro-coagulation apparatus 84. To determine if the wastewater is ready for the coagulation/electro-coagulation apparatus, a comparison of the measured pH of the wastewater and an expected pH value for the treated wastewater is performed. The coagulation/electro-coagulation apparatus 84 performs coagulation/flocculation and clarification of the treated wastewater.

The output from the coagulation/electro-coagulation apparatus is then pumped into a settling apparatus, or area, 86. Within the settling apparatus 86, sludge 88 may be removed from the wastewater before that treated wastewater (which may now be seen as clarified water) is pumped, via a second pump 90, through a series of media filtration devices 92 before being discharged.

Figure 5:
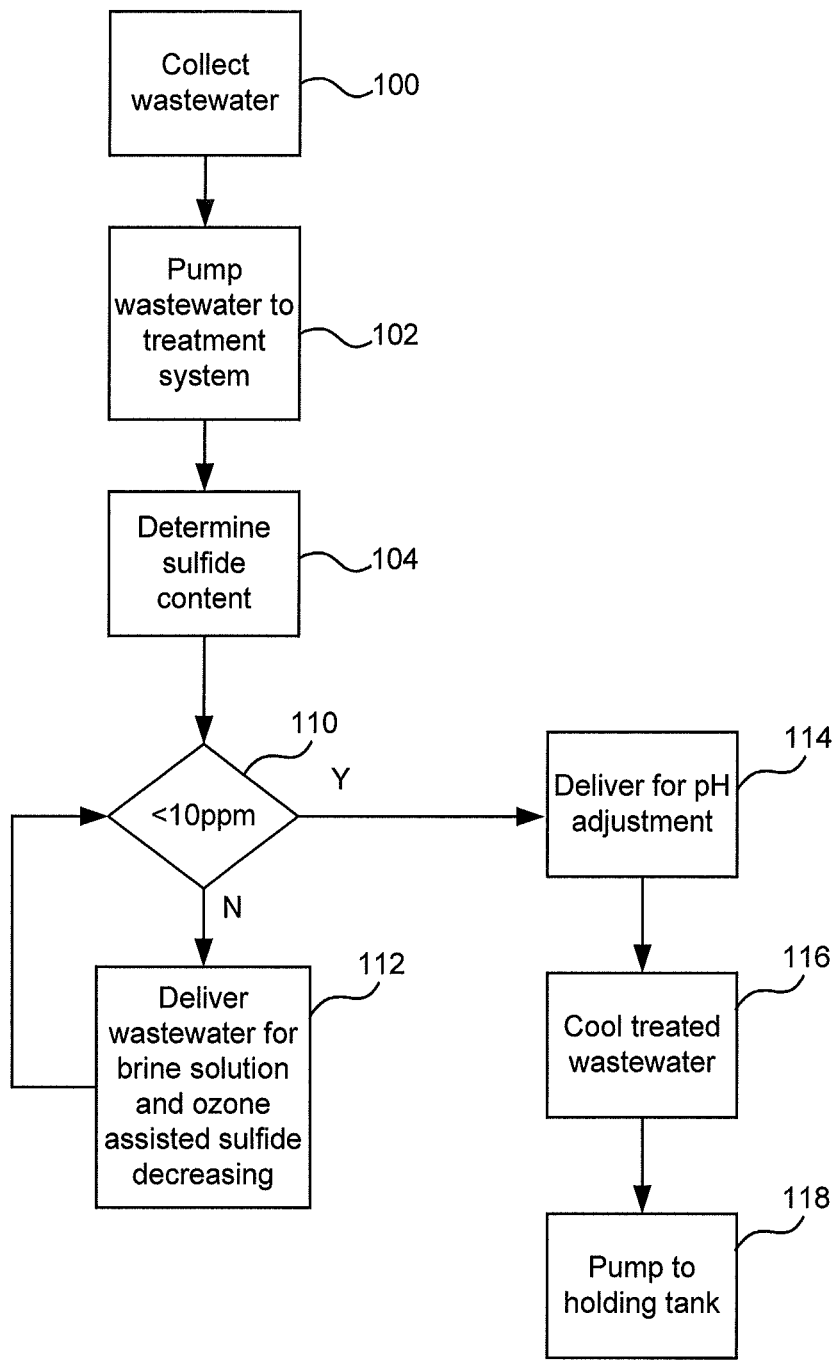
FIG. 5 is a flowchart outlining a method of treating spent caustic wastewater in accordance with the system of FIG. 1.

Turning to FIG. 5, a flowchart outlining a method of treating spent caustic wastewater is shown. This method is related to the system of FIG. 1. Initially, the wastewater is collected in the wastewater tank (100). The wastewater may be either deposited into an empty wastewater tank 12 that is already connected to a treatment system 14 or the treatment system 14 may be connected up to a wastewater tank 12 that is already full of or holding wastewater to be treated. As will be understood, the collection of wastewater may not be part of the treatment process as a wastewater tank full of wastewater may be provided by an external party, such as a customer.

The wastewater is preferably filtered to remove solid particulates prior to the treatment process. Alternatively, a filter may be placed within the piping between the wastewater tank 12 and the treatment system 14 to filter out solid particulates. In yet a further embodiment, the filtering may be performed by a self-cleaning filter or a self-indexing filter system (downstream of the feed pump 28 or wastewater tank 12) to remove impurities from the wastewater.

The wastewater is then pumped, such as by the feed pump 28, from the wastewater tank 12 to the treatment system 14 (102). A level of sulfide content in the wastewater is then measured or determined (104) to assist in determining a treatment for the wastewater. In one embodiment, the level of sulfide within the wastewater is measured by a sensor and then a treatment based on this measurement determined. In another embodiment, the level of sulfide is pre-measured at a lab and then the measurements entered into the CPU 32 to determine the level or type of treatment. In yet another embodiment, a treatment is inputted into the CPU 32 which then translates the input or inputs into instructions for the treatment system 14.

Depending on the determined treatment based on the total sulfide content, the wastewater may be transmitted to either the brine solution and ozone treatment apparatus 18 (and agitator 36) or the pH adjustment apparatus 20.

If the total sulfide content is greater than about 10 ppm (106), the wastewater is delivered to the brine solution and ozone treatment apparatus 18 and subjected to a brine solution and ozone reaction function (112). This function includes combining the wastewater with the brine solution and ozone mixture. The brine solution and the ozone mixture may be pumped in individually via the brine solution tank 22 and the ozone generator 24, respectively, and mixed within the ozone treatment apparatus or the brine solution and ozone may be mixed prior to be pumped or delivered to the brine solution and ozone treatment apparatus 18. Although not shown in the Figures, apparatus for pumping in the brine solution and/or the ozone or a mixture of the two ingredients will be understood by one skilled in the art. Furthermore, the flow rate of ozone gas into the treatment system is preferably adjustable.

The brine solution is preferably a mixture of sodium salts in the form of group VIIa elements (fluorine, chlorine, bromine or iodine) along with a metal soluble salt of halogens such as, but not limited to, potassium-bromide, magnesium-bromide, calcium-bromide or zinc bromide. When mixed with the ozone, the formation of reactive halogen species (fluorine, chlorine, bromine or iodine) is initiated by the oxidation of halides which then produces multiple propagation reactions.

For instance, in one example, the aqueous oxidation of bromide by ozone to form HOBr occurs as follows:

$$O_3(aq)+Br^-\rightarrow OBr^-+O_2(aq)$$

$$OBr^-+H^+\rightarrow HOBR(aq)$$

The HOBr formed can then participate in a propagation reaction of aqueous bromide to form molecular bromine:

$$HOBr(aq)+Br^-+H^+\rightarrow Br_2(aq)+H_2O(L)$$

When two or more halides are present in the wastewater, or process stream, then a molar ratio of halide species plays a role and impacts the propagation sequence. Therefore, with both chlorides and bromides present, the following propagation sequence may occur:

$$HOBr(aq)+Cl^-+H^+\rightarrow BrCl(aq)H_2O(L)$$

$$BrCl(aq)+Br^-\rightarrow Br_2(aq)+Cl^-$$

Therefore, these halides may be a source of a secondary oxidant to assist in the treatment of spent caustic wastewater.

The brine solution and ozone treatment function decreases the total sulfides in the wastewater to acceptable levels with a combination of a brine solution, ozone gas, mechanical agitation and ultrasonic irradiation. The rate of ozone gas addition and the concentration of ozone gas being added are dependent upon the particular chemical characteristics of the wastewater being treated as measured. As the treatment by the brine solution and ozone treatment apparatus 18 and agitator 36 continues, the sulfide content is continuously monitored or measured or both.

If the total sulfide content is less than 10 ppm (at 110), the wastewater, either from the wastewater tank 12 if the original determination of total sulfide content (in 106) is less than 10 ppm or the brine solution and ozone treatment apparatus 18 after the total sulfide content has been reduced via the brine solution and ozone sulfide decreasing function to less than 10 ppm, is delivered (114) to the pH adjustment apparatus 20.

The second function, which may be seen as a pH lowering function, assists in lowering the pH of the wastewater being treated. This pH adjustment is preferably performed by adding a metered amount of acid to the wastewater being treated to lower its pH, preferably to approximately 7 on the pH scale. The acid is preferably added by a variable speed pump which allows the rate of acid addition to be adjusted, if needed. The concentration of acid and the rate of addition of the acid are dependent upon the particular chemical characteristics of the wastewater being treated.

A typical caustic neutralization reaction using hydrochloric acid is as follows:

$$NaOH+HCl\rightarrow NaCl+H_2O$$

Because pH adjustment is only done when the wastewater no longer contains high levels of sulfides, the release of harmful gasses into the environment may be effectively limited or controlled.

After exiting the pH adjustment apparatus, the treated wastewater may then be cooled (116) before being pumped (118) to the holding tank 30. If the level of sulfide content in the treated wastewater does not meet a threshold or if other properties of the treated wastewater do not meet expected criteria or parameters, the treated wastewater may be pumped back to the wastewater tank 12 and the treatment process repeated. Otherwise, the treated wastewater may be processed further, such as by the apparatus shown in FIGS. 3 and 4.

Figure 6:
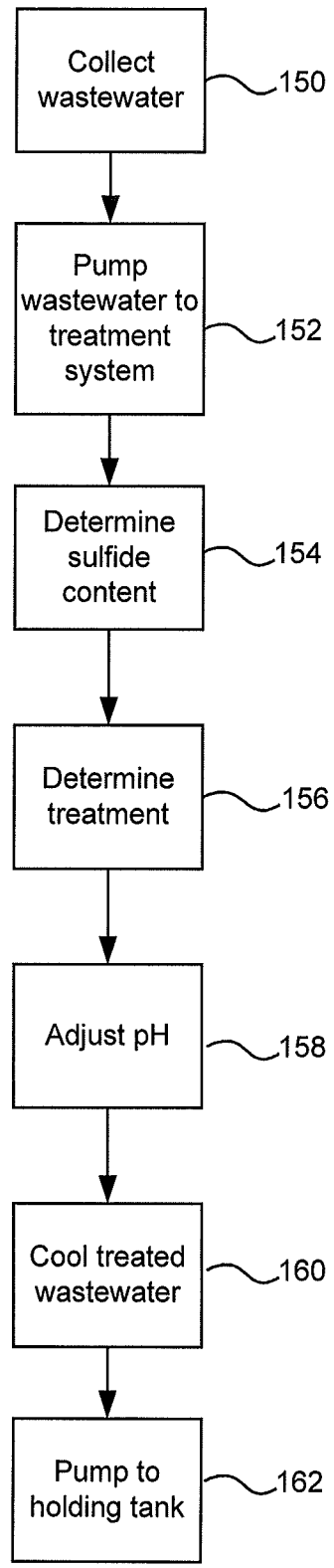
FIG. 6 is a flowchart outlining a method of treating spent caustic wastewater in accordance with the system of FIG. 2.

Turning to FIG. 6, a flowchart outlining a method of treating spent caustic wastewater with respect to the embodiment of FIG. 2 is shown. Initially, the wastewater is collected in the wastewater tank 52 (150). The wastewater may be either deposited into an empty wastewater tank 52 that is already connected to a treatment system 62 or the treatment system 62 may be connected up to a wastewater tank 52 that is already full of or holding wastewater to be treated. The wastewater is preferably filtered to remove solid particulates prior to the treatment process, as described above.

The wastewater is then pumped, such as by the feed pump 60, from the wastewater tank 52 to the treatment system (152). A level of sulfide content in the wastewater is then determined (154) to assist in determining a treatment for the wastewater. Different ways of measuring the level of sulfide content are disclosed above.

After determining the level of sulfide content in the wastewater, a treatment is then determined (156). In the current embodiment, the level of sulfide content is inputted into the CPU 76 which determines the necessary amounts of brine solution 64 and ozone 66 for the treatment process along with the level of agitation by the agitator 69 and ultrasonic irradiation by the ultrasound apparatus 68.

A typical flow ratio of brine solution to the spent caustic wastewater is about 0.0125-0.03325 to 1.0, depending on the type and chemical composition of the spent caustic wastewater as well as brine concentration. Brine solution can be injected into a flow-through reactor (containing the wastewater to the treated) at a single injection point or multi-port points. Upon injection of the brine solution, the brine solution enters a mixing zone of the flow-through reactor to allow for contact between the liquid streams of the brine solution and the spent caustic wastewater. In one embodiment, the mixing or mechanical agitation is achieved by using a disk mixer, preferably rotating between about 1,000 to about 3,000 resolutions per minute.

At the same point or almost simultaneously, an ozone stream is introduced into the wastewater within the treatment system 62. A molar ratio of brine solution to ozone is kept within 2.5-7.5 to 1.0 to ensure safe and efficient operation. The disk mixer provides instantaneous dispersion of ozone in the spent caustic wastewater and brine solution mixture, where the formation of reactive halogen species (Fluorine, Chlorine, Bromine, or Iodine) is initiated by the oxidation of halides, which is followed by multiple propagation reactions to yield a secondary oxidant form. The net result is that the oxidation is safe, more reactive and faster in the brine solution process which allows the method of the disclosure to, preferably, be more efficient than some current solutions.

In addition, the chemical oxidation process is supported and accelerated by the agitation, or irradiation, caused by ultrasound apparatus or the agitator. It has been observed that ultrasound can greatly enhance chemical reactivity in a number of systems by as much as a million-fold; effectively acting as a catalyst by exciting the atomic and molecular modes of the treatment system (such as, but not limited to, vibrational, rotational, and translational modes). In operation, the effects of ultrasound do not typically come from a direct interaction with molecular species but sonochemistry and sonoluminescence arises from acoustic cavitation: the formation, growth, and implosive collapse of bubbles in a liquid. Cavitational collapse produces intense local heating (~5000 K), high pressures (~1000 atm), and enormous heating and cooling rates (>10 9 K/sec). Acoustic cavitation provides a unique interaction of energy and matter, and ultrasonic irradiation of liquids causes high energy chemical reactions to occur, and yet not changing the temperature of the liquid medium in which it is introduced.

In a preferred embodiment, the irradiation by ultrasound is in the range of 20-150 Hz, depending on the target chemical compounds to be oxidized (long strait chain, phenolics, cresylics, etc.). Generally, the rate of homogeneous sonochemical reaction decreases with a rise of the bulk liquid temperature. The complex oxidation process of the chemical compounds in the treated wastewater continues after the treated wastewater exits the treatment system 62.

In some embodiments, given that the oxidation reactions of the chemical compounds found in the spent caustic wastewater are exothermic in nature, the heat released during the treatment process and the temperature of the treated wastewater rises in the treatment system 62. To counteract the heat generation, which may dramatically reduce the oxidation rate of sulfides and therefore reduce process efficiency, the flow of the spent caustic wastewater is in part or completely run through a heat exchanger during the treatment process. Typically, the operating temperature of the treatment process is between about 0-25 degrees Celsius. Due to a low operating temperature range, most of the oil dispersed in the spent caustic wastewater is not oxidized and will end up as a floating layer in a spent caustic tank ready for separation.

After completing the treatment of the wastewater via the addition of the brine solution and ozone, an output of the treatment system 62 is then passed through the pH adjustment apparatus 70 (158) which adds an acid to the output in order to balance the treated wastewater (if necessary). The output from the pH adjustment apparatus is then cooled (160) before being pumped to the holding tank 54 (162). As with the method of FIG. 5, if the characteristics of the treated wastewater do not meet certain criteria, the treated wastewater in the holding tank 54 may be pumped back to the wastewater tank 52 to be treated again. Alternatively, if the characteristics of the treated wastewater do meet certain criteria, the treated wastewater may be delivered for further processing such as by the apparatus in FIGS. 3 and 4 as discussed above.

In an alternative embodiment, during the treatment process, any gas formation may be vented though a set of gas collection lines from the treatment system into a gas catalytic converter—where all harmful gaseous compounds, such as hydrogen-sulfide, mercaptans and unreacted ozone, may be effectively destroyed before being released into the atmosphere.

In other embodiments, the treatment system may comprise a plurality of individual systems and components connected together, for example as a permanent on-site treatment facility.

In another embodiment, the CPU and electrical distribution systems may be located inside the main equipment enclosure. The electrical distribution system provides electrical power and overcurrent protection for all of the system's electrical devices.

In yet a further embodiment, hydrogen sulfide and ozone gas detectors are located in the main equipment enclosure and monitored by the control system or CPU. The sensors, in combination with the CPU, may enunciate an alarm and shut down the treatment system if hydrogen sulfide or ozone gas is detected outside of the process piping in excess of predetermined levels (i.e. leakage). For instance, this may occur if hydrogen sulfide or ozone gas is detected outside of the process piping at levels of over 10 parts per million (ppm) or 0.1 ppm, respectively. If leakage is detected, the treatment system may be stopped, drained and purged immediately. In addition, ventilators may be instantaneously started to remove toxic gases and to ventilate the environment around the system 10. The ventilated air is preferably fed through carbon filters to limit the amount of harmful gas escaping into the environment.

In another embodiment, the process feed pump, filter and heat exchanger may be contained in a single module whereby the pump circulates the wastewater through the treatment system, the filter removes suspended solids from the wastewater, and the heat exchanger removes the heat that is generated from chemical reactions in the treatment process preferably maintaining a process temperature below 30° C.

The particular acid for the pH adjustment varies, depending upon availability and the chemical characteristics of the wastewater being treated.

Using a bromide salt or brine solution as the source of the secondary oxidant in the current disclosure has further advantages. One advantage is that its hydration enthalpy (energy) is lower and produces fewer side reactions generating heat, making the process safer and easier to operate. Another advantage is that with lower heat generation from chemical reactions during the process, oxidation may be achieved in a faster rate compared with other known treatment systems reducing both the process time per unit of contaminants and need to cool the system down. Another advantage is that with reduced oxidation time and reduced electricity need for cooling the system down, the process productivity, and ultimately efficiency, is increased. Furthermore, in some instances, the brine solution provides operational flexibility to meet the treatment objective. Aside from the above mentioned advantages, sodium-bromide has specifically been found to be extremely effective as the source of secondary oxidant in the cases where other solutions have produced poor or no results at all. These cases will be presented in details below.

In a preferred embodiment, the gas catalyzer module 74 includes two catalyzers that utilize oxygen gas and a granular catalyst to remove or reduce ozone and hydrogen sulfide gases from the process and convert them to benign gases before releasing them to the atmosphere. The oxygen generator 24 may include a machine that extracts oxygen from the surrounding atmosphere to supply the oxygen gas that feeds the ozone gas generator and catalyzers.

In yet another embodiment. all materials that are in contact with the wastewater (e.g. the piping) are either stainless steel or non-metallic materials that are designed to convey the corrosive chemicals present in the wastewater.

The following illustrates experiments which were performed when using a brine solution in the treatment of spent caustic wastewater.

Experiment 1—Treatment of Spent Caustic Wastewater from a Refinery

Initial Conditions:
  Total Sulfides concentration: 20,100 mg/L
  Disulfides: 2,300 mg/L
  Hydrogen-sulfide: >50 mg/L
  pH: 13.6
  Concentration of Ozone: 0.1 mol/L
  Concentration of sodium-bromide (dry salt): 0.34 mol/L

| | Time (hr) | | | | |
|---|---|---|---|---|---|
| | 0 | 2 | 4 | 6 | 8 |
| Temperature (degrees Celcuis) | 19 | 26 | 24 | 24 | 23 |
| Total Sulfides (mg/L) | 20,100 | 9,070 | 3,100 | 200 | <10 |

Volume tested: 0.1 L and 1 L in the lab setting, 1,000 L pilot
Experiment 2—Treatment of Spent Caustic Wastewater from a Refinery
Initial Conditions:
    Total Sulfides concentration: 17,900 mg/L
    Disulfides: 6,700 mg/L
    Hydrogen-sulfide: >100 mg/L
    pH: 13.0
    Phenol: 270 mg/L
    Concentration of Ozone: 0.1 mol/L
    Concentration of sodium-bromide (dry salt): 0.34 mol/L

| Time (hr) | 0 | 2 | 4 | 6 | 8 | 9 |
|---|---|---|---|---|---|---|
| Temperature (degrees Celcuis) | 21 | 26 | 225 | 25 | 22 | 22 |
| Total Sulfides (mg/L) | 17,900 | 13,650 | 10,100 | 5,200 | 870 | <10 |
| Phenol (mg/L) | 270 | 220 | 135 | 88 | 21 | <1 |

Volume tested: 0.1 L and 1 L in the lab setting, 1,000 L pilot
Experiment 3—Treatment of Spent Caustic Wastewater from a Refinery
Initial Conditions:
    Total Sulfides concentration: 54,000 mg/L
    Disulfides: 9,600 mg/L
    Hydrogen-sulfide: >100 mg/L
    pH: 13.3
    Phenol 620 mg/L
    Concentration of Ozone: 0.1 mol/L
    Concentration of sodium-iodide (dry salt): 0.27 mol/L

| Time (hr) | 0 | 2 | 4 | 5 | 6 | 7 |
|---|---|---|---|---|---|---|
| Temperature (degrees Celcuis) | 20 | 23 | 25 | 26 | 24 | 24 |
| Total Sulfides (mg/L) | 54,000 | 23,000 | 11,500 | 4,100 | 2,500 | <60 |
| Phenol (mg/L) | 620 | 430 | 272 | 144 | 66 | <1 |

Volume tested: 0.1 L and 1 L in the lab setting, 1,000 L pilot
Experiment 4—Treatment of Spent Caustic Wastewater from a Refinery
Initial Conditions:
    Total Sulfides concentration: 54,000 mg/L
    Disulfides: 9,600 mg/L
    Hydrogen-sulfide: >100 mg/L
    pH: 13.3
    Phenol 620 mg/L
    Concentration of Ozone: 0.1 mol/L
    Concentration of sodium-chloride (dry salt): 0.75 mol/L

| Time (hr) | 0 | 2 | 4 | 5 | 6 | 7 |
|---|---|---|---|---|---|---|
| Temperature (degrees Celcuis) | 21 | 24 | 25 | 26 | 25 | 25 |
| Total Sulfides (mg/L) | 54,000 | 27,000 | 13,500 | 5,200 | 1,700 | <25 |
| Phenol (mg/L) | 620 | 460 | 312 | 167 | 74 | <1 |

Volume tested: 0.1 L and 1 L in the lab setting, 1,000 L pilot
Experiment 5—Treatment of Spent Caustic Wastewater from a Refinery
Initial Conditions:
    Total Sulfides concentration: 17,900 mg/L
    Disulfides: 6,700 mg/L
    Hydrogen-sulfide: >100 mg/L
    pH: 13.0
    Phenol 270 mg/L
    Concentration of Ozone: 0.1 mol/L
    Concentration of sodium-chloride (dry salt): 0.375 mol/L

| | Time (hr) | | | |
|---|---|---|---|---|
| | 0 | 2 | 3 | 4 |
| Temperature (degrees Celcuis) | 21 | 24 | 25 | 25 |
| Total Sulfides (mg/L) | 17,900 | 11,000 | 4,050 | <75 |
| Phenol (mg/L) | 270 | 161 | 27 | <1 |

Volume tested: 0.1 L and 1 L in the lab setting, 1,000 L pilot
Experiment 6—Treatment of Sour Water from a Stripper Unit at a Refinery
Initial Conditions:
    Total Sulfides concentration: 1,200 mg/L
    Hydrogen-sulfide: >100 mg/L
    Ammonium: 950 mg/L
    pH: 9.7
    Phenol: 10 mg/L
    Concentration of Ozone: 0.1 mol/L
    Concentration of sodium-bromide (dry salt): 0.09 mol/L

| Time (hr) | 0 | 2 | 3 | 4 | 6 | 7 |
|---|---|---|---|---|---|---|
| Temperature (degrees Celcuis) | 19 | 19 | 19 | 19 | 19 | 19 |
| Total Sulfides (mg/L) | 1,200 | 0 | 0 | 0 | 0 | 0 |
| Phenol (mg/L) | 10 | 0 | 0 | 0 | 0 | 0 |
| Ammonia (mg/L) | 950 | 800 | 400 | 300 | 180 | 42 |

Volume tested: 0.1 L and 1 L in the lab setting, 1000 L pilot
Experiment 7—Treatment of Sour Water from a Stripper Unit at a Refinery
Initial Conditions:
    Total Sulfides concentration: 1,200 mg/L
    Hydrogen-sulfide: >100 mg/L
    Ammonium: 950 mg/L
    pH: 9.7
    Phenol: 10 mg/L Concentration of Ozone: 0.1 mol/L
Concentration of sodium-chloride (dry salt): 0.16 mol/L

|  | Time (hr) | | | | |
| --- | --- | --- | --- | --- | --- |
|  | 0 | 2 | 3 | 4 | 5 |
| Temperature (degrees Celcuis) | 18 | 18 | 18 | 18 | 18 |
| Total Sulfides (mg/L) | 1,200 | 0 | 0 | 0 | 0 |
| Phenol (mg/L) | 10 | 0 | 0 | 0 | 0 |
| Ammonia (mg/L) | 950 | 600 | 290 | 190 | <50 |

Volume tested: 0.1 L and 1 L in the lab setting, 1000 L pilot
Experiment 8—Treatment of Sour Water from a Stripper Unit at a Refinery
Initial Conditions:
    Total Sulfides concentration: 1,200 mg/L
    Hydrogen-sulfide: >100 mg/L
    Ammonium: 950 mg/L
    pH: 9.7
    Phenol: 10 mg/L
    Concentration of Ozone: 0.1 mol/L
    Concentration of sodium-iodide (dry salt): 0.07 mol/L

|  | Time (hr) | | | | |
| --- | --- | --- | --- | --- | --- |
|  | 0 | 2 | 3 | 4 | 6 |
| Temperature (degrees Celcuis) | 18 | 18 | 18 | 18 | 18 |
| Total Sulfides (mg/L) | 1,200 | 0 | 0 | 0 | 0 |
| Phenol (mg/L) | 10 | 0 | 0 | 0 | 0 |
| Ammonia (mg/L) | 950 | 680 | 310 | 125 | <25 |

Volume tested: 0.1 L and 1 L in the lab setting, 1000 L pilot
Experiment 9—Treatment of Phenol Rich Water
Initial Conditions:
    Phenol: 4,070 mg/L
    Original pH: 6.8—process pH has been adjusted to 9.5 by NaOH addition.
    Concentration of Ozone: 0.1 mol/L
    Concentration of sodium-bromide (dry salt): 0.17 mol/L

| Time (hr) | 0 | 1 | 2 | 3 | 4 | 6 |
| --- | --- | --- | --- | --- | --- | --- |
| Temperature (degrees Celcuis) | 21 | 21 | 22 | 22 | 22 | 22 |
| Phenol (mg/L) | 4,070 | 3,020 | 1,500 | 980 | 510 | <10 |

Volume tested: 0.1 L and 1 L in the lab setting, 1,000 L pilot
Experiment 10—Treatment of Phenol Rich Water
Initial Conditions:
    Phenol: 4,070 mg/L
    Original pH: 6.8—process pH has been adjusted to 9.5 by NaOH addition.
    Concentration of Ozone: 0.1 mol/L
    Concentration of sodium-chloride (dry salt): 0.3 mol/L

| Time (hr) | 0 | 1 | 2 | 3 | 4 | 5 |
| --- | --- | --- | --- | --- | --- | --- |
| Temperature (degrees Celcuis) | 20 | 20 | 20 | 20 | 20 | 20 |
| Phenol (mg/L) | 4,070 | 2,055 | 990 | 630 | <125 | <10 |

Volume tested: 0.1 L and 1 L in the lab setting, 1,000 L pilot
Experiment 11—Treatment of Phenol Rich Water
Initial Conditions:
    Phenol: 4,070 mg/L
    Original pH: 6.8—process pH has been adjusted to 9.5 by NaOH addition.
    Concentration of Ozone: 0.1 mol/L
    Concentration of sodium-iodide (dry salt): 0.12 mol/L

| Time (hr) | 0 | 1 | 2 | 3 | 4 | 6 |
| --- | --- | --- | --- | --- | --- | --- |
| Temperature (degrees Celcuis) | 21 | 21 | 21 | 21 | 21 | 21 |
| Phenol (mg/L) | 4,070 | 3,300 | 1,900 | 1,100 | 132 | <10 |

Volume tested: 0.1 L and 1 L in the lab setting, 1,000 L pilot
Experiment 12—Series of Tests for Treatment of Ethanolamines (MDEA, DEA, TEA) Rich Water
Initial Conditions for Test 1:
    Methyldiethanolamine (MDEA): 1,000 mg/L
    Original pH: 8.5
    Concentration of Ozone: 0.1 mol/L
    Concentration of sodium-bromide (dry salt): 0.0097 mol/L

|  | Time (hr) | | | | |
| --- | --- | --- | --- | --- | --- |
|  | 0 | 1 | 2 | 3 | 4 |
| MDEA (mg/L) | 1000 | 720 | 510 | 230 | <0.5 |

Volume tested: 0.1 L and 1 L in the lab setting
Initial Conditions for Test 2:
    Diethanolamine (DEA): 1,000 mg/L
    Original pH: 9.7
    Concentration of Ozone: 0.1 mol/L
    Concentration of sodium-bromide (dry salt): 0.0195 mol/L

|  | Time (hr) | | | | |
| --- | --- | --- | --- | --- | --- |
|  | 0 | 1 | 2 | 3 | 4 |
| DEA (mg/L) | 1000 | 795 | 610 | 317 | <5 |

Volume tested: 0.1 L and 1 L in the lab setting
Initial Conditions for Test 3:
    Triethanolamine (TEA): 1,100 mg/L
    Original pH: 10.17
    Concentration of Ozone: 0.1 mol/L
    Concentration of sodium-bromide (dry salt): 0.0195 mol/L

|  | Time (hr) | | | | |
| --- | --- | --- | --- | --- | --- |
|  | 0 | 1 | 2 | 3 | 4 |
| TEA (mg/L) | 1100 | 690 | 405 | 190 | 0.48 |

Volume tested: 0.1 L and 1 L in the lab setting

In yet another embodiment, the system for treating spent caustic wastewater includes a plurality of modular components that are designed to be transported to a client's, or off-site, facility, assembled and operated there temporarily to treat wastewater that has accumulated and is stored there. Upon project completion, the system is disassembled and removed. By treating the wastewater at the site, the risk of a potentially hazardous wastewater spill during highway transport is obviated. However, the system may also be a permanent fixture whereby wastewater is transported to the system.

The present description is provided by way of example. It will be apparent to persons skilled in the art that a number of variations and modifications can be made without departing from the scope of the claims.

What is claimed is:

1. A system for treating spent caustic wastewater comprising:
   a treatment system including:
      a brine mixture and oxygen treatment apparatus configured to mix a brine mixture and ozone with the spent caustic wastewater, wherein the spent caustic wastewater comprises greater than 10 ppm total sulfide content;
      a pH adjustment apparatus configured to mix acid with the spent caustic wastewater; and
      an agitator for providing a mechanical catalyst to an output of the oxygen treatment apparatus; and
   an ultrasound apparatus to assist in accelerating chemical reactions between the spent caustic wastewater, the brine mixture and ozone;
   wherein the combination of the brine mixture, ozone and spent caustic wastewater and the mechanical catalyst produce a treated wastewater, wherein the treated wastewater comprises less than 10 ppm total sulfide content;
   wherein the brine mixture is a combination of a halogen and an alkaline component; and
   wherein the alkaline component is ammonia ($NH_3$).

2. The system of claim 1 wherein the halogen is selected from the group consisting of fluorine (F), chlorine (Cl), bromine (Br) and iodine (I).

3. The system of claim 1 further comprising a coolant pump for cooling the treated wastewater.

4. The system of claim 1 further comprising:
   a wastewater tank, connected to an input of the treatment system, for holding the spent caustic wastewater; and
   a holding tank, connected to an output of the treatment system, for holding the treated wastewater.

5. The system of claim 4 further comprising a pump for pumping the spent caustic wastewater from the wastewater tank to the holding tank.

6. The system of claim 5 further comprising:
   a brine mixture tank for storing the brine mixture for use by the brine mixture and ozone treatment apparatus;
   an oxygen generator for storing ozone for use by the brine mixture and oxygen treatment apparatus; and
   an acid tank for storing acid for use by the pH adjustment apparatus.

7. A method of treating spent caustic wastewater comprising:
   mixing a halogen with an alkaline component to produce a brine mixture;
   mixing the brine mixture with the spent caustic wastewater wherein the spent caustic wastewater comprises greater than 10 ppm total sulfide content;
   adding ozone to the spent caustic wastewater;
   applying a mechanical catalyst to a combination of the brine mixture, ozone and the spent caustic wastewater; and
   applying an ultrasound cavitation to the combination of the brine mixture, ozone and the spent caustic wastewater to produce a treated wastewater, wherein the treated wastewater comprises less than 10 ppm total sulfide content;
   wherein the alkaline component is ammonia ($NH_3$).

8. The method of claim 7 further comprising:
   adding an acid to balance a pH of the combination to produce a treated wastewater.

9. The method of claim 8 wherein the halogen is selected from the group consisting of fluorine (F), chlorine (Cl), bromine (Br) and iodine (I).

10. The method of claim 7 wherein the brine mixture and the ozone are mixed together before being added to the spent caustic wastewater.

11. The method of claim 7 wherein the brine mixture and the ozone are added to the spent caustic wastewater concurrently.

* * * * *